US007493652B2

(12) United States Patent
Aura

(10) Patent No.: US 7,493,652 B2
(45) Date of Patent: Feb. 17, 2009

(54) VERIFYING LOCATION OF A MOBILE NODE

(75) Inventor: Anssi Tuomas Aura, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 10/736,952

(22) Filed: Dec. 15, 2003

(65) Prior Publication Data

US 2005/0041634 A1  Feb. 24, 2005

Related U.S. Application Data

(60) Provisional application No. 60/493,125, filed on Aug. 6, 2003.

(51) Int. Cl.
*H04L 9/32* (2006.01)
(52) U.S. Cl. .............................. 726/2; 713/153; 370/351
(58) Field of Classification Search ................. 713/153; 370/351; 726/2
See application file for complete search history.

(56) References Cited

U.S. PATENT DOCUMENTS

| | | | | |
|---|---|---|---|---|
| 6,377,982 B1* | 4/2002 | Rai et al. | | 709/217 |
| 6,760,444 B1* | 7/2004 | Leung | | 380/270 |
| 6,769,000 B1* | 7/2004 | Akhtar et al. | | 707/103 R |
| 6,823,461 B2* | 11/2004 | Lakshmi Narayanan et al. | | 726/13 |
| 6,954,790 B2* | 10/2005 | Forslow | | 709/227 |
| 6,959,009 B2* | 10/2005 | Asokan et al. | | 370/475 |
| 6,970,459 B1* | 11/2005 | Meier | | 370/389 |
| 7,130,614 B2* | 10/2006 | Sreemanthula et al. | | 455/411 |
| 7,155,500 B2* | 12/2006 | Nikander | | 709/223 |

OTHER PUBLICATIONS

Arkko, et al., "Securing IPv6 Neighbor and Router Discovery", ACM, WiSe '02, Sep. 28, 2002, pp. 77-86.*
Perkins, et al., "Mobility Support in IPv6", ACM, MOBICOM 1996, pp. 27-37.☐☐.*
Montavont, et al., "Handover Management for Mobile Nodes in IPv6 Networks", IEEE Communications Magazine, Aug. 2002, pp. 38-43.*
Perkins, "Mobile Networking Through Mobile IP", IEEE Internet Computing, 1998, pp. 58-69.*
"IPv6 Stateless Address Autoconfiguration", Susan Thomson and Thomas Narten, RFC 2462, IETF Network Working Group, Dec. 1998 (also available at: http://www.ietf.org/rfc/rfc2462.txt).

* cited by examiner

*Primary Examiner*—Kambiz Zand
*Assistant Examiner*—William S Powers
(74) *Attorney, Agent, or Firm*—Microsoft Corporation

(57) ABSTRACT

A secure router protocol yields a secure router advertisement for inclusion in binding updates between a mobile node and a correspondent node. Inclusion of the mobile node's home address or other security data relating to the mobile node's identity in the secure routing advertisement allows a correspondent node to verify the identity of the mobile node. Furthermore, inclusion of the advertising access router's subnet prefix and signatures allows a correspondent node to verify that the mobile node that sent the binding update is located at the subnet prefix.

20 Claims, 5 Drawing Sheets

VERIFYING LOCATION OF A MOBILE NODE

RELATED APPLICATIONS

The present application claims benefit of U.S. Provisional Patent No. 60/493,125 entitled "A METHOD FOR PROVING THE LOCATION OF A MOBILE NODE" and filed on Aug. 6, 2003, incorporated herein by reference for all that it discloses and teaches.

TECHNICAL FIELD

The invention relates generally to mobile communications networks, and more particularly to verifying location of a mobile node in a communications network.

BACKGROUND

Wireless technology provides many options for enhanced mobility in computing. For example, a modern computer user may use a wireless handheld computer to connect to a communications network, such as the Internet. The mobile characteristic of a wireless handheld computer allows a user to access the communications network from different access points, even within a single network session. For example, a user may maintain Internet access through a wireless computing device while riding a light rail train to work during his morning commute. However, the access points through which he accesses the Internet are likely to change during the commute Mobility support for wireless computers grows more important as mobile computing becomes more widespread. As such, efforts are underway to standardize such mobility support. One continuing effort is reflected in the evolving Mobile IPv6 standard, a mobility protocol for IPv6 (short for "Internet Protocol Version 6"). IPv6 is the "next generation" protocol designed by the Internet Engineers Task Force (IETF) to replace Internet Protocol, IP Version 4 ("IPv4"). However, existing approaches and proposals relating to Mobile IPv6 require excessive message handshaking or fail to adequately address security issues.

SUMMARY

Implementations described and claimed herein address the foregoing problems by providing a secure router protocol that yields a secure router advertisement for inclusion in address updates, such as Mobile IPv6 binding updates, between a mobile node and a correspondent node. Inclusion of the mobile node's home address or other security data relating to the mobile node's home identity in the secure routing advertisement allows a correspondent node to verify the identity of the mobile node. Furthermore, inclusion of the advertising access router's subnet prefix and signatures allows a correspondent node to verify that the mobile node that sent the address update is located at the subnet prefix. As such, single-message address updates are made secure as to both mobile node identity and location.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

A computer program product encodes a computer program for executing a computer process on a computer system. A secure router advertisement is attached to an address update associated with a mobile node. The address update including the attached secure router advertisement is sent to a correspondent node.

In another implementation, a method is provided. A secure router advertisement is attached to an address update associated with a mobile node. The address update including the attached secure router advertisement is sent to a correspondent node.

In another implementation, a system includes a node that attaches a secure router advertisement to an address update associated with a mobile node and sends the address update including the attached secure router advertisement to a correspondent node.

In yet another implementation, a computer program product encodes a computer program for executing a computer process receiving an address update from a mobile node. The address update includes a secure router advertisement, a purported identifier of the mobile node, and a purported current address. It is verified that the secure router advertisement is signed by an authorized access router and that the purported current address is associated with the authorized access router. It is also verified that data from the secure router advertisement associates the purported identifier with the purported current address.

In yet another implementation, a method receives an address update from a mobile node. The address update includes a secure router advertisement, a purported identifier of the mobile node, and a purported current address. It is verified that the secure router advertisement is signed by an authorized access router and that the purported current address is associated with the authorized access router. It is also verified that data from the secure router advertisement associates the purported identifier with the purported current address.

In yet another implementation, a correspondent node receives an address update from a mobile node. The address update includes a secure router advertisement, a purported identifier of the mobile node, and a purported current address. The correspondent node verifies that the secure router advertisement is signed by an authorized access router, that the purported current address is associated with the authorized access router, and that data from the secure router advertisement associates the purported identifier with the purported current address.

Other implementations are also described and recited herein.

BRIEF DESCRIPTIONS OF THE DRAWINGS

DETAILED DESCRIPTION

Figure 1:
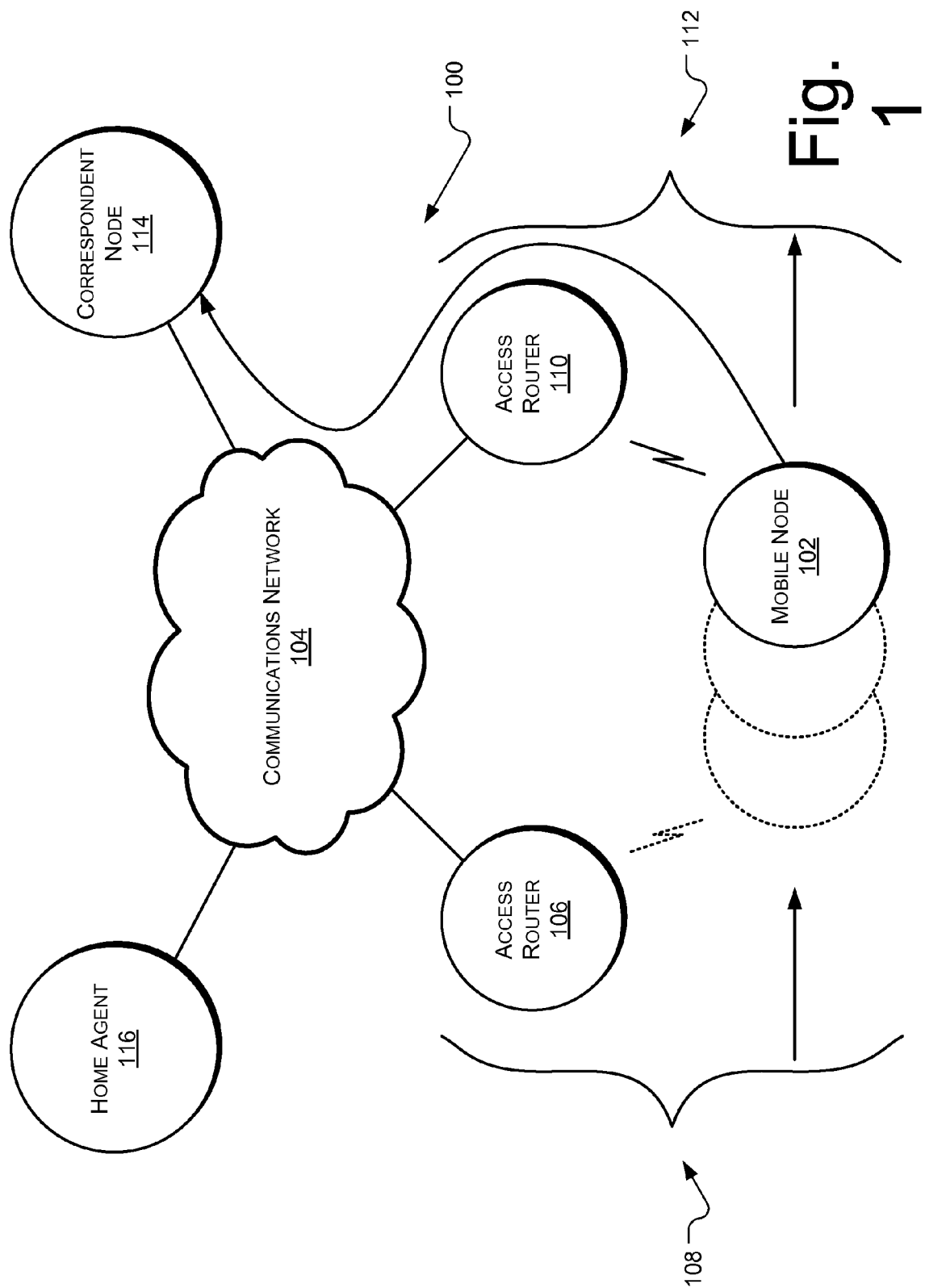
FIG. 1 illustrates an exemplary implementation of an enhanced Mobile IPv6 network architecture.

FIG. 1 illustrates an exemplary implementation 100 of an enhanced Mobile IPv6 network architecture. A mobile node 102 is shown as initially accessing a communications network 104 through an access router 106 on an access network 108. However, the mobile node 102 travels geographically or changes the media it uses for accessing the communications network 104 such that, after some period of time, the mobile node 102 accesses the network 104 through another access router 110 on another access network 112. While Mobile IPv6 is used as an example of a mobile network architecture in this description, it should be understood that the applications of the invention are not limited to Mobile IPv6. The invention can be used to enhance any protocol where an Internet node sends address updates to another entity on the Internet.

The mobile node 102 represents a computing device, which may include without limitation a laptop computer, a desktop computer, handheld computer, a Personal Digital Assistant (PDA), a mobile phone, and any other addressable device capable of communicating through a the communications network 104. It should also be understood that mobility is not limited to geographical changes. In one alternative, a device may be considered mobile because it can switch from a connection with a wireless access point to a connection through a wired adapter.

The mobile node 102 communicates with a correspondent node (CN) 114 through the communications network 104. For example, the mobile node 102 may request streaming media from a Web radio station available at the correspondent node 114. Generally, any Internet node may become mobile, and any Internet node may be a correspondent node.

For communication over the network 104, the mobile node 102 has an address that matches the subnet prefix belonging to the current access network. This address is termed the "care-of address" (CoA). In one implementation, the mobile node 102 obtains the subnet prefix of the access network 108 by listening to secure router advertisements (RAs) that are transmitted by the access router 106, and obtains the CoA by executing the stateless address autoconfiguration protocol, as described in "IPv6 Stateless Address Autoconfiguration", Susan Thomson and Thomas Narten, RFC 2462, IETF Network Working Group, December 1998, incorporated herein by reference. When the mobile node 102 moves from the access network 108 to the access network 112, it connects to the communications network 104 via a different access router (i.e., access router 110), and therefore obtains a new subnet prefix and a new CoA. As such, the subnet prefix and the CoA represent the "location" of the mobile node at a given time.

The mobile node 102 also has a home network somewhere on the communications network 104. A router called a home agent (HA) 116 is connected to the home network of the mobile node 102. The mobile node 102 is identified to its correspondent nodes by a home address (HoA), which has the subnet prefix of the mobile node's home network. Generally, the HoA represents a persistent identifier for the mobile node 102. The HoA may be used to identify the same mobile node 102 to correspondent nodes when the mobile node 102 moves between access networks (i.e., as its CoA changes). It should be noted, however, that while the HoA may be used to identify the mobile node 102 in accordance with the Mobile IPv6, other implementations need not depend on a specific type of identifier for the mobile node 102. Other types of identifiers may be used instead including but not limited to domain names, use names, public keys, and identifier of groups to which the mobile node belongs.

In basic operation of the Mobile IPv6 protocol, the mobile node 102 communicates with its correspondent node 114 via the home agent 116 that is located at the mobile node's HoA. The home agent 116 forwards packets between the CoA and the correspondent node 114, so that only the home agent 116 needs to know the current CoA of the mobile node 102—the correspondent node 114 assumes that the mobile node 102 is still "at home" and therefore does not need to know the mobile node's CoA. However, this basic operational mode of the Mobile IPv6 protocol results in suboptimal routing because, when the mobile node 102 is not at home, all packets routed between the mobile node 102 and the correspondent node 114 are routed through the home agent 116.

Therefore, Mobile IPv6 defines an optimized mode of operation, called route optimization (RO), in which the mobile node 102 and the correspondent node 114 communicate directly with each other, skipping the intermediary forwarding of the home agent 116. The packets sent by the mobile node 102 to the correspondent node 114 contain the mobile node's current CoA as their source address and the correspondent node's address as their destination address. An IPv6 destination option, called home-address-option (HAO), includes the mobile node's HoA in these packets to identify the mobile node 102 to the correspondent node 114. An exemplary packet format of a packet sent from the mobile node 102 to the correspondent node 114 is in the form:

| Route Optimization packet from mobile node to correspondent node | |
| --- | --- |
| Source Address = | current CoA of mobile node 102 |
| Destination Address = | address of correspondent node 114 |
| Home-address-option = | HoA of mobile node 102 |
| Data = | packet data |

The packets sent by the correspondent node 114 to the mobile node 102 contain the correspondent node's address as their source address and the CoA of the mobile node 102 as their destination address. A routing header (RH) type 1 in each of these packets contains the mobile node's HoA, which informs the mobile node 102 that the packet is intended for the mobile node 102, not any other node that may have previously used the same CoA. An exemplary packet format of a packet sent from the correspondent node 114 to the mobile node 102 is in the form:

| Route Optimization packet from correspondent node to mobile node | |
| --- | --- |
| Source Address = | address of correspondent node 114 |
| Destination Address = | current CoA of mobile node 102 |
| Routing Header Type 1 = | HoA of mobile node 102 |
| Data = | packet data |

Before route optimization may be used, the mobile node 102 informs the correspondent node 114 of its CoA. In one implementation, the mobile node 102 uses a binding update (BU) message to tell the correspondent node 114 that a mobile node with a specified HoA is currently located at the specified CoA. However, a malicious node may provide false binding updates that provide a false identity of the mobile node ("false HoA") or a false location of the mobile node ("false CoA"). Therefore, for security purposes, the mobile node 102 provides a verifiable proof of location in association with its binding update such that the correspondent node 114 can verify: (1) that the binding update was actually sent by the mobile node with the specified HoA; and (2) that the mobile node that sent the binding update is actually located at the CoA (i.e., gaining access to the communications network through the access network with the subnet prefix of the CoA). An exemplary packet format of a binding update message is in the form:

| Binding Update from mobile node to correspondent node | |
| --- | --- |
| Source Address = | current CoA of mobile node 102 |
| Destination Address = | address of correspondent node 114 |
| HoA Statement = | specifies HoA of mobile node 102 |
| Data = | authentication data |

It should be understood, however, that other forms of binding updates may also be employed.

Various methods for providing a verifiable proof of location to solve the false HoA and false CoA problems have been proposed previously. However, such proposed authentication methods exhibit certain unsatisfactory characteristics, including dependence on the existence of a certification authority and a mechanism for distributing the public-key certificates; less than acceptable authentication performance (e.g., in the case of a return-routability protocol, which requires at least a 3-message handshake); or the inability of verifying the correctness of the entire subnet-prefix (e.g., in the case of authentication based on cryptographically-generated addresses).

Therefore, in FIG. 1, the binding update message is supplemented with verifiable proofs of location and identify of the mobile node, without resorting to excessive handshaking or a complex change in the infrastructure of existing access networks. Another standard currently under development by the IETF is directed to secure neighbor and router discovery (SEND). If approved, deployment of infrastructure supporting SEND can also be useful in authenticating binding update messages. Generally, routers on a secure network that supports the secure router discovery protocol have an authorized certification chain that can be verified by all secure nodes on the network. The router sends signed router advertisements (RAs) either as broadcasts to all nodes on the local network or as unicast transmissions in response to individual router solicitations (RSs). Enhanced secure router advertisements may be used in combination with binding updates to allow verification of the mobile node's location (e.g., the CoA).

Figure 2:
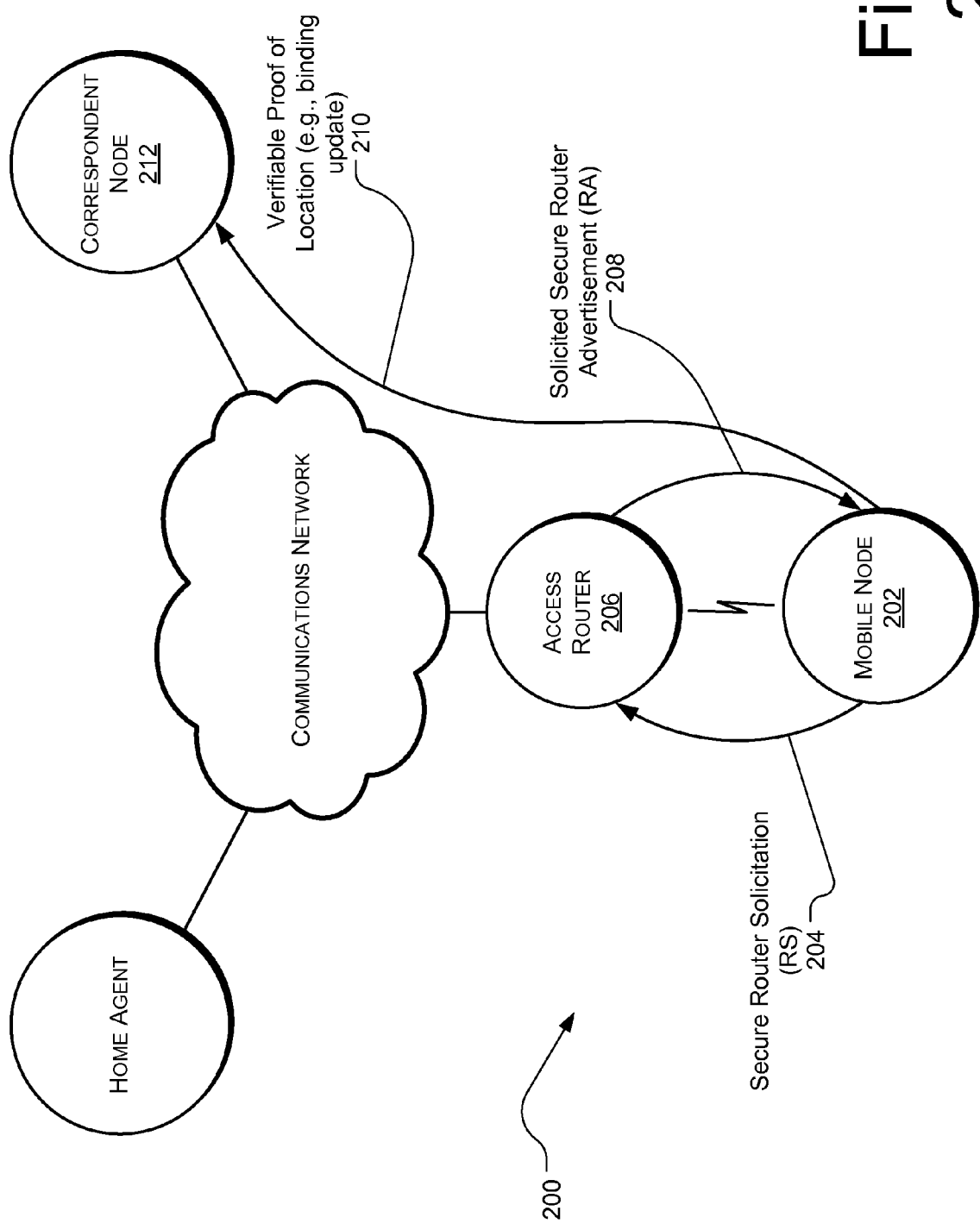
FIG. 2 illustrates an exemplary implementation of an enhanced secure router discovery protocol.

FIG. 2 illustrates an exemplary implementation 200 of an enhanced secure router discovery protocol. A mobile node 202 multicasts a secure router solicitation 204 to the all-routers multicast address on the local link. The secure router discovery protocol specifies that the secure RS includes a nonce field. In some implementations of the secure router protocol, the nonce field contains a random value that is generated by the soliciting mobile node. The nonce field is specified as an arbitrary-length octet string, which the access router 206 blindly copies into a unicast RA, as explained below. However, other nonce field formats may also be employed.

In an alternative implementation that addresses security concerns associated with verifying the location of the mobile node 202, the nonce field or a part of the field is populated with security data that identifies the soliciting mobile node 202. In one implementation, the security data includes the HoA of the mobile node 202. It should be understood, however, that other identifiers or parameters of the mobile node 202 may be used in place of or in addition to the HoA. For example, a public key (or a hash thereof, collectively referred to as a "public key") may be included in the nonce field.

Upon receipt of the secure RS 204, the access router 206 sends to the soliciting mobile node 202 a signed unicast RA 208, which contains the access network's subnet prefix, timestamp, a nonce field value, and the access router's signature. In one implementation, the access router 206 creates the secure RA 208, including the access network's subnet prefix, a time stamp of the current time, and a copy of the value in the RS's nonce field into a nonce field in the RA, and signs the RA 208 with its private key. As such, when the RS contains the mobile node's HoA in the nonce field of the RS 204, the access router 206 returns the HoA of the soliciting mobile node 202 in its signed RA 208.

The access router 206 sends the certificate (i.e., the signed RA 208) to the soliciting mobile node 202. The corresponding public key and any other necessary certificates associated with the access router 206 the can be sent either together with the signed RA 208 or distributed in some other way to the mobile node 202. The soliciting mobile node 202 can also use the time stamp to verify the freshness of the advertisement based on the assumption that the clocks in the access router 206 and in the soliciting mobile node 202 are at least loosely synchronized.

The mobile node 202 may have previously configured a CoA that matches the subnet prefix in the secure RA 208. In that case, the mobile node 202 can continue using the existing CoA. On the other hand, if the mobile node 202 does not have a CoA that matches the subnet prefix from the secure RA, the mobile node 202 obtains such an address, such as by using a stateless autoconfiguration protocol or by some other mechanism.

In yet another implementation, the nonce field of the RS 204 includes both a random value nonce and the mobile node's HoA or another identifier of the mobile node. This approach allows the mobile node 202 to use the nonce field for its original purpose (i.e., verifying the freshness of the secure RA) as well as for proving its location to a correspondent node, as described below.

When the mobile node 202 generates its binding update 210 to send to a correspondent node 212, it may use various techniques (e.g., public-key certificates, cryptographically-generated addresses, or return-routability) for authenticating itself as the sender of the binding update 210, although single-message approaches are considered more efficient. The mobile node 202 attaches the signed RA 208 to the binding update 210 as verifiable proof of its current location. The secure RA 208 may be used alone for this purpose or it may be combined with other security data. Thus, the mobile node 202 sends the supplemented binding update to the correspondent node.

Upon receipt of the binding update 210, the correspondent node 212 verifies both the sender of the binding update 210 (e.g., the purported HoA or other mobile node identifier) and the purported current location of this sender (e.g., the CoA or other mobile node location information). That is, in one implementation, the correspondent node 212 verifies that the binding update 210 was sent by the mobile node that is designated by the purported HoA included in the binding update 210 and that there is a valid signed RA that shows a mobile node with the same HoA (or a node willing to represent the mobile node 202) to be located at the network having a subnet prefix that matches that of the CoA.

In order to verify the authenticity of the signed RA in the binding update 210, the correspondent node 212 obtains (or has previously obtained) the access router's public key and a certificate or certificate chain that authorized the access router 206 to advertise the subnet prefix in the RA. The mobile node 202 can forward the public key and optionally the certificate(s) in the binding update 210 to the correspondent node 212, or they can be distributed to the correspondent node 212 in some other way. The correspondent node 212 verifies the public key of the access router 206 or the top-level certification authority that certifies the public key. A public-key infrastructure (PKI) or similar infrastructure may be used for this purpose.

As described, a protocol for verifying location of a mobile node does not require an access router to verify the physical presence of a mobile node in its access network. Therefore, it is possible for another node in on the access network to obtain the router advertisement on behalf of the mobile node and sent it to the mobile node. This approach allows another node to act as a representative (e.g., a proxy) for the mobile node 202 in obtaining the secure RA or in sending the binding update 210.

In yet another alternative implementation, the mobile node may instead include other identification information or parameters associated with the mobile node in the nonce field of the RS. Examples of such identification information may include without limitation a domain name, the mobile node's public key, a hash of the public key, some other cryptographic identifier, or a pseudonymous identifier used for privacy protection. For example, the mobile node can then use the same public key or other cryptographic identifier to sign or otherwise authenticate the binding update to the correspondent node, thereby creating an indirect binding between the mobile node's home address and the access router's RA.

In yet another alternative implementation, the proof of location may include two factors: (1) a secure RA and (2) a signature based on a cryptographically-generated CoA. In this implementation, the secure RA proves the correctness of the subnet prefix specified in the CoA and the signature proves the correctness of the remaining address bits of the CoA.

An exemplary cryptographically-generated address (CGA) technique may therefore be used for authenticating the sender of the binding update. The mobile node can include in the nonce field of the RS the same public key (or hash thereof) that was used for creating the cryptographically-generated HoA. For example, the mobile node has a cryptographically-generated HoA, which will be inserted into the mobile node's binding update. In this implementation, the same public key used for cryptographically-generating the HoA is used to sign the binding update.

The mobile node also includes the same public key in the nonce field of the secure RS. After receiving the secure RS, the access router copies the nonce value (i.e., the public key value) from the secure RS into the secure RA. When the mobile node receives the secure RA, the mobile node attaches the secure RA to the binding update message and sends the binding update to the correspondent node.

The correspondent node then verifies the signature on the binding update in-order to authenticate the sender of the binding update, verifies that the binding update has been signed by an authorized access router, and verifies that the nonce field in the secure RA attached to binding update contains the same public key that was used to generate the mobile node's cryptographically-generated HoA in the binding update. If the binding update is thus verified, the location and identity of the mobile node are also verified.

Figure 3:
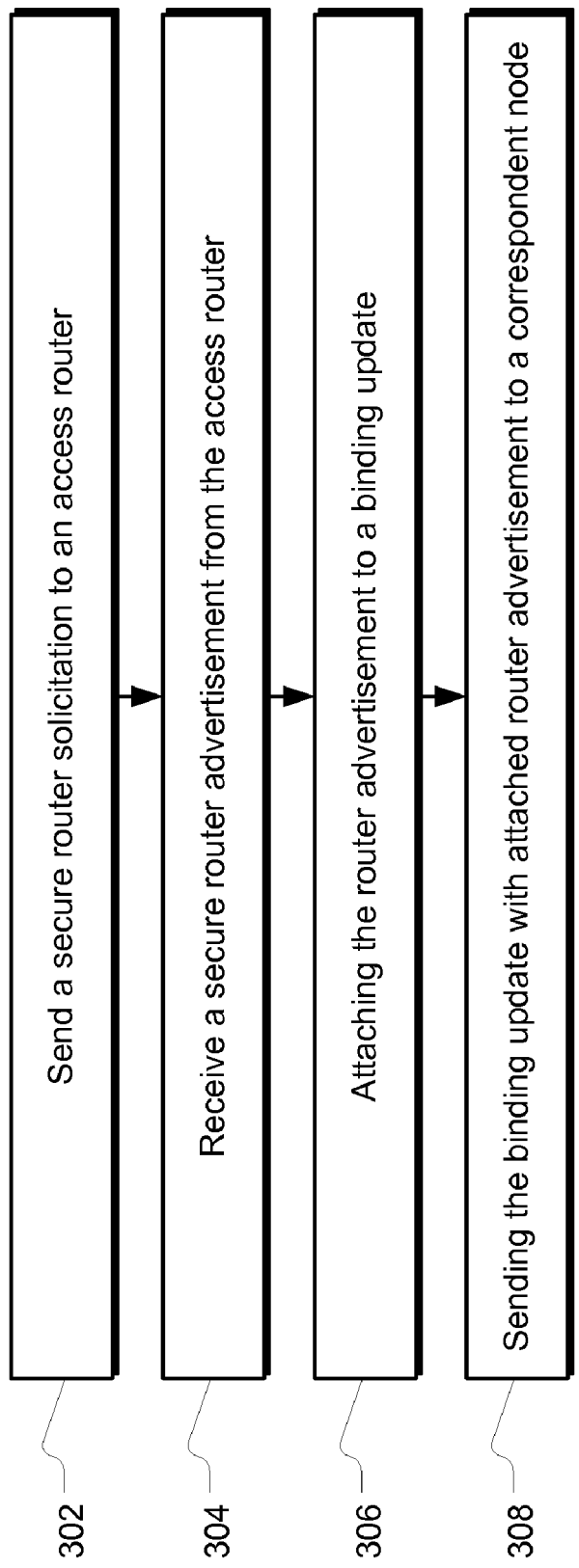
FIG. 3 illustrates exemplary operations for providing verifying proof of location of a mobile node.

FIG. 3 illustrates exemplary operations 300 for providing verifying proof of location of a mobile node. A sending operation 302 sends a secure router solicitation to one or more access routers. In one implementation, a secure router solicitation includes a nonce field, which may be set to the HoA of the mobile node, a public key of the mobile node, or some other data identifying the mobile node. A receiving operation 304 receives, in a unicast message from an access router, a responsive secure router advertisement, which typically also includes a nonce field although other formats may be employed. The mobile node verifies that the identifying information (e.g., HoA or public key) received in the secure RA from the access router matches the identifying information the mobile node sent in the secure RS.

An attaching operation 306 attaches the secure RA to a binding update for the mobile node. An exemplary binding update may include a purported home address for the mobile node, a purported care-of address for the mobile node, as well as authentication information, including the secure RA. Other forms of binding update messages may include public key signatures or codes computed using multiple secret keys or secret numbers, such as those obtained using return-routability techniques. A sending operation 308 sends the binding update, including the attached secure RA to a correspondent node, which can use the binding update to verifying the location and identity of the mobile node.

Figure 4:
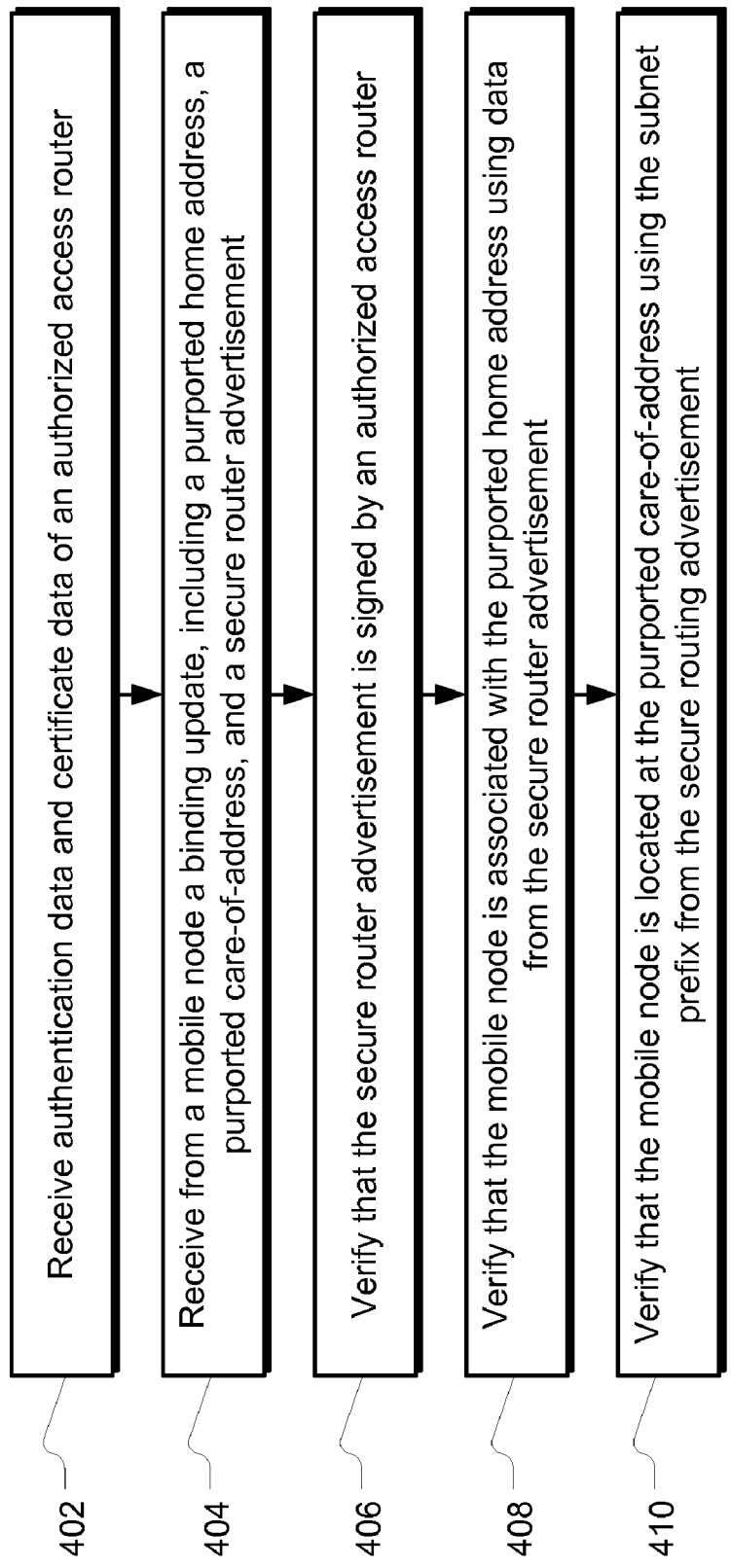
FIG. 4 illustrates exemplary operations for verifying location of a mobile node.
Figure 5:
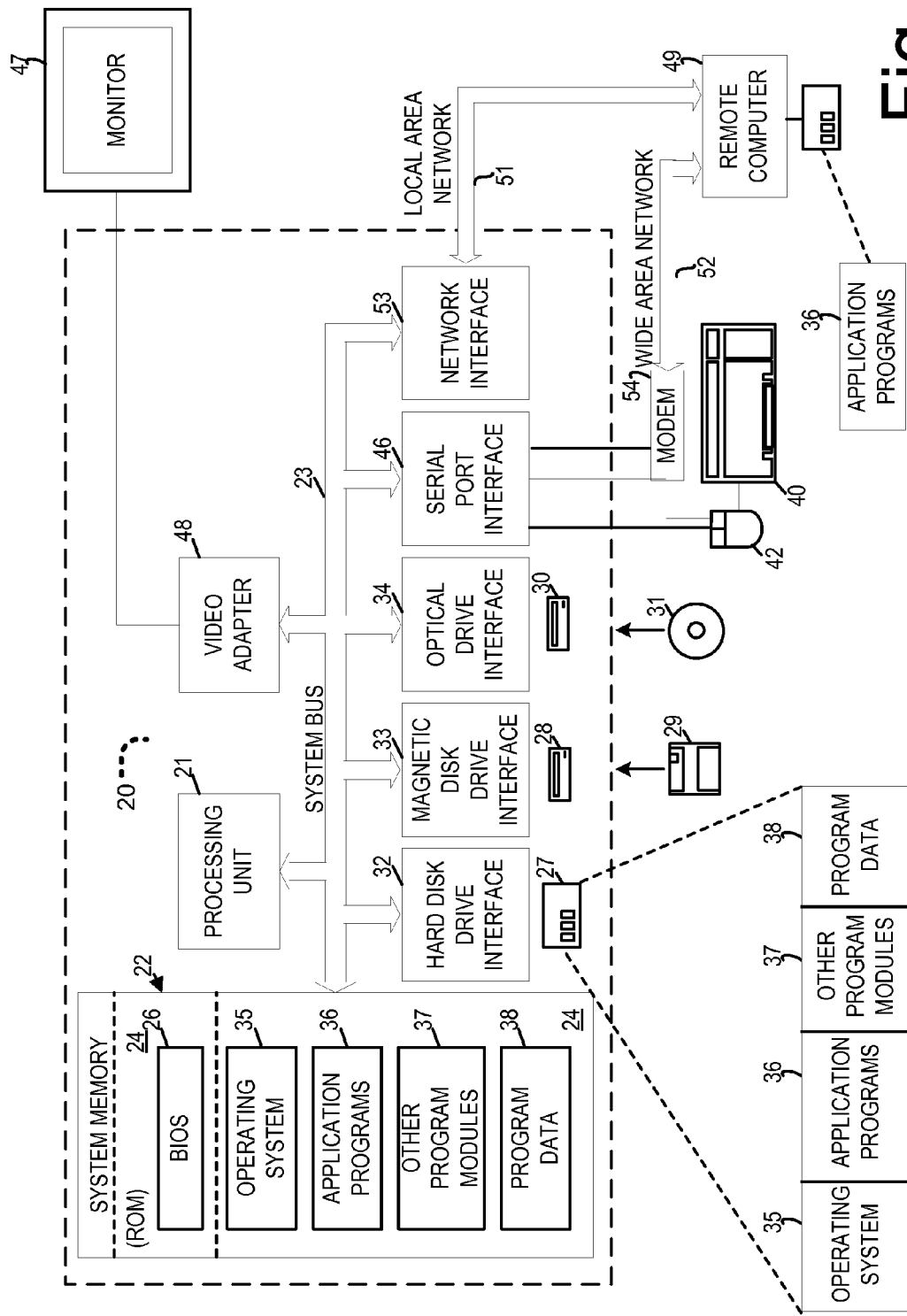
FIG. 5 illustrates a system useful for implementing an embodiment of the present invention.

FIG. 4 illustrates exemplary operations 400 for verifying location of a mobile node. A receiving operation 402 receives authentication data and authorization data associated with an access router authorized to advertise a given subnet prefix. Another receiving operation 404 receives a binding update contain a purported HoA of the sender, a purported CoA of the sender, and authentication data. In one implementation, the authentication data includes the mobile node's signature and a secure RA, which includes the HoA or another identifier of the mobile node from the secure router dialogue. In another implementation, the authentication data includes a cryptographically-generated HoA of the mobile node and a secure RA, which includes the public key that was used to generate the cryptographically-generated HoA.

A verification operation 406 uses the authentication and authorization data relating the access router to verify that the access router that signed the secure RA is authorized to advertise the subnet prefix specified in the RA. Another verification operation 408 uses data from the secure RA to verify that the sender is associated with the purported HoA in the binding update. In one implementation, the purported HoA is evaluated against the HoA in the secure RA to determine whether the purported HoA matches the HoA signed by the authorized access router. In an alternative implementation, a public key from the secure RA is used to decrypt a cryptographically-generated HoA of the mobile node. If the public key decrypts the cryptographically-generated HoA such that it matches the purported HoA, the HoA of the mobile node is verified. Another verification operation 410 verifies that the purported CoA of the binding update matches the subnet prefix of the secure RA. The third verification operation 410 provides a connection between the HoA (or another mobile node identifier) that was verified in the second verification operation 408 and the subnet prefix from the secure router advertisement that was verified in the first verification operation 406. With such verifications, both the identity and location of the mobile node are verified for the current binding update.

The exemplary hardware and operating environment of FIG. 6 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 6. The logical connections depicted in FIG. 6 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a secure routing protocol module of an access router or of a mobile node, a binding update module of a mobile node or a correspondent node, other security modules of a mobile node and a correspondent node, and other modules may be incorporated as part of the operating system 35, application programs 36, or other program modules 37. Secure router solicitations, secure router advertisements, binding updates and other data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of sending a mobile node address update to a corresponding node, comprising:
    multicasting, from a mobile node, a secure router solicitation to one or more access routers, the secure router solicitation including a router solicitation nonce field populated with an identifier of the mobile node;
    in response to the secure router solicitation, receiving from an access router a secure router advertisement at the mobile node, the secure router advertisement including a router advertisement nonce field which includes a copy of a value of the router solicitation nonce field, the value of the router solicitation nonce field being the identifier of the mobile node sent in the secure router solicitation;
    attaching, at the mobile node, the secure router advertisement to an address update to be sent to a correspondent node, wherein the secure router advertisement includes the router advertisement nonce field populated with the identifier of the mobile node; and
    sending the address update including the attached secure router advertisement to a correspondent node.

2. The method of claim 1 wherein the address update includes a Mobile IPv6-compliant binding update.

3. The method of claim 1 wherein the address update is sent by a node acting as a representative of the mobile node.

4. The method of claim 1 wherein the identifier of the mobile node is a home address of the mobile node.

5. The method of claim 1 wherein the identifier of the mobile node is a public key of the mobile node.

6. The method of claim 1 wherein the secure router advertisement includes a signature of the access router associated with an access network, wherein the mobile node may receive one or more messages at an address that belongs to the access network of the access router.

7. The method of claim 1 wherein the secure router advertisement includes a signature of an access router associated with an access network, wherein a representative of the mobile node may receive one or more messages at an address that belongs to the access network of the access router.

8. The method of claim 1 wherein the mobile node is associated with a cryptographically-generated address generated by a public key and the secure router advertisement includes the same public key.

9. The method of claim 1 wherein the mobile node is associated with a current address within the access network and the address update specifies the current address of the mobile node.

10. The method of claim 1, further comprising:
   receiving an address update from a mobile node, the address update including a secure router advertisement, a purported identifier of the mobile node, and a purported current address, wherein at least the purported identifier of the mobile node is included
   in the nonce field of the secure router advertisement, the secure router advertisement been received by the mobile node from an authorized access router;
   verifying that the secure router advertisement is signed by the authorized access router;
   verifying that the purported current address is associated with the authorized access router; and
   verifying the association between the purported identifier and the purported current address using data from the secure router advertisement.

11. The method of claim 10 wherein the address update is a Mobile IPv6 binding update.

12. The method of claim 10 wherein the purported identifier is a Mobile IPv6 home address.

13. The method of claim 10 wherein the current address is a Mobile IPv6 care-of address.

14. The method of claim 10 wherein the operation of verifying the association between the purported identifier and the purported current address comprises:
   reading an identifier from the secure router advertisement; and
   verifying that the purported identifier matches the identifier read from the secure router advertisement.

15. The method of claim 10 wherein the operation of verifying the association between the purported identifier and the purported current address comprises:
   reading a home address from the secure router advertisement; and
   verifying that the purported identifier matches the home address.

16. The method of claim 10 wherein the purported identifier is a cryptographically-generated address associated with the mobile node and the operation of verifying the association between the purported identifier and the current address comprises:
   reading a public key from the secure router advertisement; and
   verifying that the same public key was used to generate cryptographically-generated address.

17. The method of claim 10 wherein the authorized access router is associated with a subnet prefix specified in the secure router advertisement and the operation of verifying that the purported current address is associated with the authorized access router comprises:
   verifying that the purported current address matches subnet prefix.

18. The method of claim 10 wherein the operation of verifying that the secure router advertisement is signed by an authorized access router comprises:
   verifying that a signature used to sign the secure router advertisement is associated with an access router authorized by certification to advertise a subnet prefix specified in the secure router advertisement.

19. The method of claim 1 wherein the secure router advertisement is a signed unicast secure router advertisement.

20. The method of claim 1 wherein the secure router advertisement further includes a subnet prefix of the access router.

* * * * *